3,644,515
BENZENESULFONYL CHLORIDE PROCESS
Shigeto Suzuki, San Francisco, Calif., assignor to Chevron Research Company, San Francisco, Calif.
No Drawing. Filed May 1, 1968, Ser. No. 725,949
Int. Cl. C07c 143/70
U.S. Cl. 260—543 R                10 Claims

ABSTRACT OF THE DISCLOSURE

Benzenesulfonyl chlorides are prepared by the reaction of benzenesulfonic acids with carbon tetrachloride in the liquid phase. Ferric chloride catalyzes the reaction.

---

This invention relates to a process for the production of sulfonyl chlorides of the formula $XC_6H_4SO_2Cl$ in which X may be hydrogen, methyl, ethyl, chloride or bromide. More particularly, it relates to the reaction of a sulfonic acid of the formula $XC_6H_4SO_3H$ (X as above) with carbon tetrachloride in the liquid phase by heating a mixture of the reactants at an elevated temperature.

Benzenesulfonic acids are well known in the chemical art. They are used for many purposes including the characterization of nitrogen containing compounds, as intermediates for the production of sulfonamides of dyes, and of the like.

It has now been found that sulfonic acids of the formula $XC_6H_4SO_3H$ (X as above) react with carbon tetrachloride when a mixture of the acid and carbon tetrachloride in the liquid phase is heated to a temperature in the range above about 130° C. and below the thermal decomposition temperature of the corresponding sulfonyl chloride. Best results obtain when ferric chloride is used to catalyze the reaction. The use of at least a substantially stoichiometric amount of carbon tetrachloride is required for a satisfactory result.

The reaction appears to be as follows:

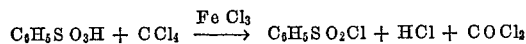

$$C_6H_5SO_3H + CCl_4 \xrightarrow{FeCl_3} C_6H_5SO_2Cl + HCl + COCl_2$$

In a preferred embodiment a mixture of benzenesulfonic acid and carbon tetrachloride in a mol ratio of 1 to 5, respectively, and containing about 2.5 weight percent of ferric chloride (based upon the sulfonic acid) is heated at about 170° C. for 8 hours under a pressure sufficient to maintain carbon tetrachloride in the liquid phase. A substantially quantitative yield of the sulfonyl chloride results.

The reaction in general proceeds slowly in the range 130–150° C. Satisfactory temperatures are in the range from about 150–200° C. With increasing temperature the rate of reaction is faster. However, benzenesulfonyl chlorides are in general temperature sensitive. The upper limit of the satisfactory reaction temperature range depends upon the decomposition temperature of the particular sulfonyl chloride being produced. In general benzenesulfonyl chloride decomposition begins at temperatures in the range from about 210–250° C.

The amount of carbon tetrachloride relative to the sulfonic acid which should be used in the instant process is one mol of the tetrachloride per mol of sulfonic acid. At lesser relative amounts, sulfonyl chloride is produced but the yields of sulfonyl chloride are poor or negligible. The presence of an excess of carbon tetrachloride, i.e., an amount exceeding stoichiometric requirements, in advantageous. On the other hand, the employment of a very large excess is undesirable for reasons of efficiency. Satisfactory amounts of the reactants, sulfonic acid and carbon tetrachloride, are usually in the range from 1 to about 0.8–100 mols, respectively. Larger relative amounts can be used, but the relative efficiency of the process is lower. The preferred ratio is 1–10 mols of the chloride per mol of the sulfonic acid.

Noticeable catalytic effects results when from about 0.001–0.005 mol of the ferric chloride per mol of sulfonic acid is used. In general, more satisfactory results are achieved when the ratio is in the range 0.05–0.5 to 1, respectively. The use of larger amounts is generally neither economical nor advantageous.

The benzenesulfonic acids as defined above are in general useful feeds for the instant process. Benzenesulfonic and the toluene sulfonic acids are preferred feeds.

Representative benzenesulfonic acids useful as feed compounds in the process include benzeneulfonic, 4-ethylbenzenesulfonic, 3-chlorobenzenesulfonic, 2-bromobenzenesulfonic, 2-methylbenzenesulfonic, 3-ethylbenzenesulfonic, 3-bromobenzenesulfonic, 4-methylbenzenesulfonic and the like acids.

The benzenesulfonic acid feed compounds have in general very small solubilities in the carbon tetrachloride. Nevertheless, the reaction proceeds at satisfactory rates so long as the pressure is sufficient to maintain the tetrachloride in the liquid phase at the reaction temperature. Best results are experienced when the heterogeneous reacting mixture is efficiently stirred.

Inert diluents can be used but in general the use of excess carbon tetrachloride rather than the diluent is more advantageous.

The reaction time which should be employed in the process varies depending upon the temperature and the feed. In general a satisfactory reaction time is in the range from a few minutes to about 10 hours. At low reaction temperatures longer reaction times may be used, i.e., 10–15 hours or more. At the high side of the temperature range, the reaction is sufficiently complete after from about 0.1–0.5 hour for substantial yields and conversions.

The following examples further illustrate the invention.

EXAMPLE 1

Benzenesulfonic acid, carbon tetrachloride and ferric chloride were charged into a corrosion resistant pressure reactor fitted for stirring and temperature control. A pressure relief valve set for a 200 p.s.i.g. release pressure was also used. For each mol of the sulfonic acid in the reaction mixture, there were five mols of carbon tetrachloride. About 2.5 weight percent of ferric chloride, based upon the acid, was used. The sealed reactor was heated at 170° C. After a two hour reaction time, the yield of sulfonyl chloride was 33 mol percent. At 8 hours it was 95 mol percent.

EXAMPLE 2

When Example 1 was repeated except that no ferric chloride catalyst was added, the results were as follows:

| | Time, hours | Yields, mol percent |
|---|---|---|
| Temperature, ° C.: | | |
| 170 | 2 | Trace |
| 190–200 | 2 | 27 |

Examples 1 and 2 demonstrate that benzenesulfonic acids react with carbon tetrachloride at elevated temperatures to yield sulfonyl chlorides. The reaction is catalyzed by ferric chloride.

The invention has been described with respect to preferred embodiments thereof, but it should be understood that variations may be made therein and equivalents may be substituted without going beyond the purview of the invention or exceeding the scope of the claims.

What is claimed is:

1. The process for the production of a sulfonyl chloride of the formula $XC_6H_4SO_2Cl$ from a sulfonic acid of the formula $XC_6H_4SO_3H$, wherein X is selected from the group consisting of hydrogen, methyl, ethyl, chloride and bromide, which consists essentially of reacting said acid with carbon tetrachloride by maintaining a mixture of said reactants at a temperature in the range above about 150° C. and below the thermal decomposition temperature of the sulfonyl chloride, at a pressure sufficient to maintain carbon tetrachloride in the liquid phase and for a time in the range from a few minutes to about 10 hours; wherein for each mol of the acid there is present in said mixture an amount of carbon tetrachloride in the range from about 0.8 to 100 mols; said decomposition temperature being in the range from about 210° C. to 250° C.

2. The process as in claim 1 wherein said sulfonic acid is benzenesulfonic acid.

3. The process as in claim 1 wherein said X of the formula is a methyl group.

4. The process as in claim 1 wherein the ratio of acid to carbon tetrachloride is 1 to 1–10, respectively.

5. The process as in claim 1 wherein said acid is benzenesulfonic acid, said reaction temperature is 190–200° C., and said acid to carbon tetrachloride mol ratio is about 1 to 5.

6. The process for the production of a sulfonyl chloride of the formula $XC_6H_4SO_2Cl$ from a sulfonic acid of the formula $XC_6H_4SO_3H$, wherein X is selected from the group consisting of hydrogen, methyl, ethyl, chloride and bromide, which consists essentially of reacting said acid with carbon tetrachloride by maintaining a mixture of said reactants at a temperature in the range above about 130° C. and below the thermal decomposition temperature of the sulfonyl chloride, at a pressure sufficient to maintain carbon tetrachloride in the liquid phase and for a time in the range from a few minutes to about 10 hours, said reaction being carried out in the presence of ferric chloride, wherein for each mol of the acid said mixture contains an amount of carbon tetrachloride in the range from about 0.8 to 100 mols and an amount of ferric chloride in the range from about 0.001–0.005 to about 1 mol, said decomposition temperature being in the range from about 210° C. to 250° C.

7. The process as in claim 6 wherein the mol ratio of the acid to carbon tetrachloride is in the range 1 to 1–10 and of the acid to ferric chloride is in the range 1 to 0.05–0.5 and wherein said reaction temperature is in the range from about 150° C. to 200° C.

8. The process as in claim 6 wherein said sulfonic acid is benzenesulfonic acid.

9. The process as in claim 6 wherein said X of the formula is a methyl group.

10. The process for the production of benzenesulfonyl chloride which consists essentially of reacting benzenesulfonic acid with carbon tetrachloride by maintaining a mixture of said reactants at a temperature of about 170° C. for a time of about 8 hours, said mixture having a mol ratio of the acid to carbon tetrachloride of about 1 to 5 and containing about 2.5 weight percent of ferric chloride.

References Cited

UNITED STATES PATENTS

| | | | |
|---|---|---|---|
| 3,449,416 | 6/1969 | Brotherton | 260—544 |
| 2,946,815 | 7/1960 | Hamor | 260—470 |
| 2,806,061 | 9/1957 | Wygant | 260—544 |
| 2,700,679 | 1/1955 | Carnahan | 260—544 |

FOREIGN PATENTS 581,615  8/1959  Canada.

LORRAINE A. WEINBERGER, Primary Examiner

E. J. GLEIMAN, Assistant Examiner